US010436309B2

(12) United States Patent
Lumetta

(10) Patent No.: US 10,436,309 B2
(45) Date of Patent: Oct. 8, 2019

(54) ELECTRONIC CONTROL SYSTEM FOR AN AUTOMOTIVE AUTOMATIC TRANSMISSION

(71) Applicant: FCA ITALY S.p.A., Turin (IT)

(72) Inventor: Salvatore Lumetta, Turin (IT)

(73) Assignee: FCA ITALY S.p.A., Turin (IT)

( * ) Notice: Subject to any disclaimer, the term of this patent is extended or adjusted under 35 U.S.C. 154(b) by 360 days.

(21) Appl. No.: 15/428,690

(22) Filed: Feb. 9, 2017

(65) Prior Publication Data

US 2017/0227117 A1 Aug. 10, 2017

(30) Foreign Application Priority Data

Feb. 10, 2016 (EP) .................................... 16155116

(51) Int. Cl.
*B60K 20/00* (2006.01)
*G05G 5/00* (2006.01)
(Continued)

(52) U.S. Cl.
CPC ..... *F16H 59/0278* (2013.01); *F16H 59/0204* (2013.01); *F16H 59/105* (2013.01); *F16H 2059/0282* (2013.01); *F16H 2059/081* (2013.01)

(58) Field of Classification Search
CPC ................ F16H 59/0204; F16H 59/12; F16H 2059/0243; F16H 2059/0295;
(Continued)

(56) References Cited

U.S. PATENT DOCUMENTS

| | | | | |
|---|---|---|---|---|
| 2012/0095657 A1 | 4/2012 | Pudvay | | |
| 2015/0267807 A1* | 9/2015 | Tokumo | F16H 59/08 701/52 | |
| 2017/0108116 A1* | 4/2017 | Kim | F16H 59/0217 | |

FOREIGN PATENT DOCUMENTS

| | | |
|---|---|---|
| EP | 1266788 A2 | 12/2002 |
| GB | 2517010 | 2/2015 |

OTHER PUBLICATIONS

European Search Report for EP Appln. No. 16 15 5116, dated Aug. 10, 2016.

* cited by examiner

*Primary Examiner* — Jake Cook
(74) *Attorney, Agent, or Firm* — Greer, Burns & Crain, Ltd.

(57) ABSTRACT

An electronic control system for a motor vehicle comprising an automatic transmission operable to assume different operating modes, comprising a reverse mode, a neutral mode, a park mode, a drive mode and a manual mode, in response to a manual operation of a selector with at least one control switch and mounted to assume a stable central neutral position when the selector is not operated, and to be movable in opposite selection directions from the stable central neutral position to reach two instable end-of-travel selection positions arranged on opposite sides of the stable central neutral position. The automotive electronic control system is configured to detect operation of the selector and of the control switch and cause the transmission to switch from drive mode to reverse mode in response to operation of the selector in a first selection direction and with the control switch pressed, and from reverse mode to drive mode in response to operation of the selector in a second selection direction opposite to the first selection direction and with the control switch pressed.

13 Claims, 2 Drawing Sheets

(51) Int. Cl.
*F16H 59/02* (2006.01)
*F16H 59/10* (2006.01)
*F16H 59/08* (2006.01)

(58) Field of Classification Search
CPC ................ F16H 59/044; F16H 59/105; F16H 2059/0221; F16H 2059/2039
See application file for complete search history.

ELECTRONIC CONTROL SYSTEM FOR AN AUTOMOTIVE AUTOMATIC TRANSMISSION

PRIORITY CLAIM

This application claims priority from European Patent Application No. 16155116.3 filed on Feb. 10, 2016, the disclosure of which is incorporated by reference.

TECHNICAL FIELD OF INVENTION

The present invention relates to an automotive electronic control system for an automotive automatic transmission.

STATE OF THE ART

As is known, the role of cognitive ergonomics in the automotive field is designing automotive onboard system interfaces capable of reducing the cognitive load on drivers whilst driving.

Considerable efforts have always been made to improve the functional organization of the various controls present on motor vehicles, including those for automatic transmissions, which increasingly equip mid and high-end motor vehicles.

OBJECT AND ABSTRACT OF THE INVENTION

The object of the present invention is providing a solution that improves simplicity, naturalness and intuitiveness of automotive automatic transmissions controls.

According to the present invention, an automotive electronic system for an automotive automatic transmission is provided, as claimed in the appended claims.

DETAILED DESCRIPTION OF PREFERRED EMBODIMENTS OF THE INVENTION

The present invention will now be described in detail with reference to the accompanying drawings to enable an expert in the field to embody it and use it. Various modifications to the described embodiments will be immediately obvious to experts in the field, and the generic principles described herein can be applied to other embodiments and applications without departing from the scope of the present invention, as defined in the appended claims. Thus, the present invention should not be considered as limited to the embodiments set forth herein, but is to be accorded the widest scope consistent with the principles and features disclosed and claimed herein.

Figure 1:
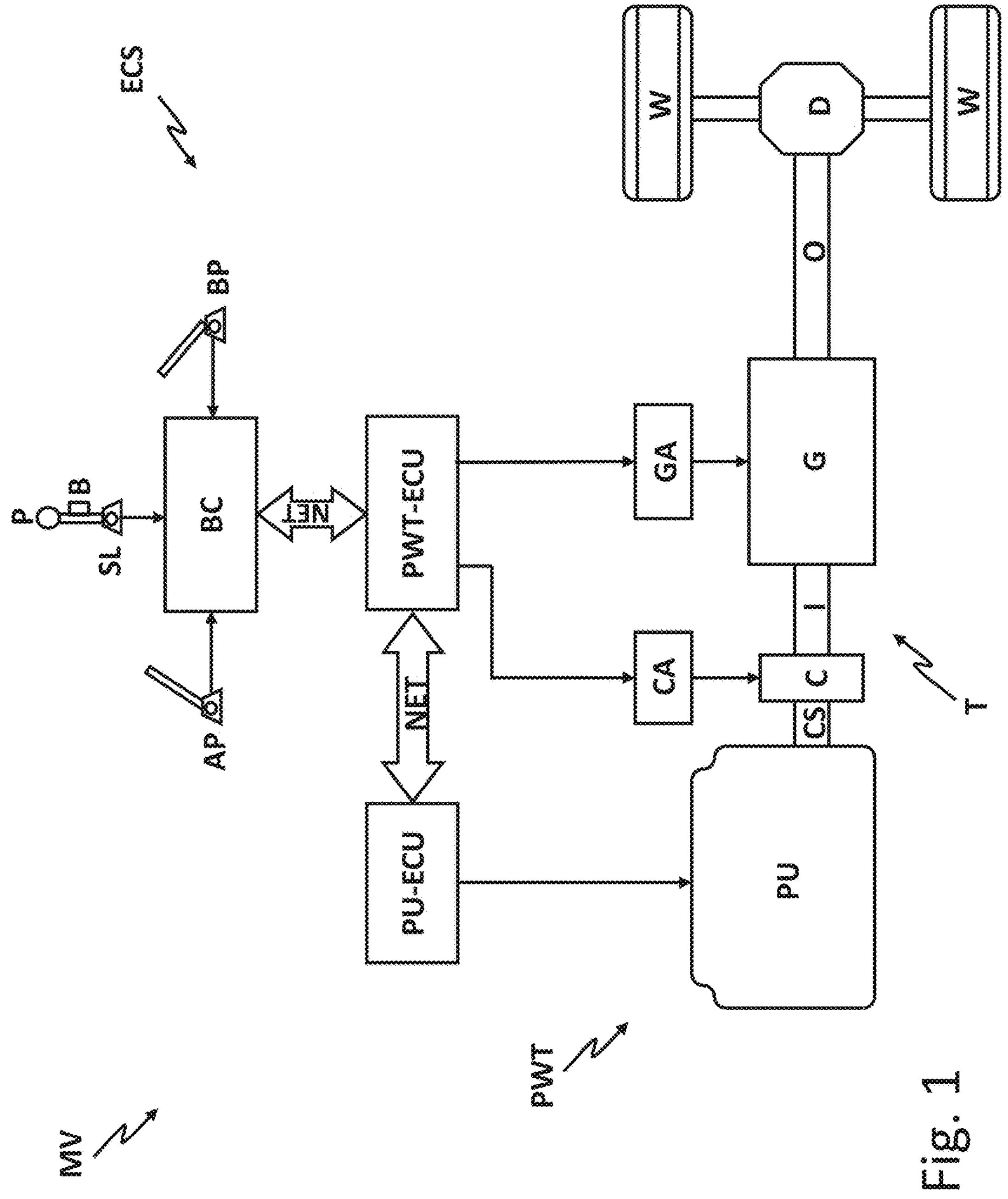
FIG. 1 shows a block diagram of an electronic control system for an automotive automatic transmission according to the present invention.

FIG. 1 shows, by way of non-limitative example, a block diagram of an automotive electronic control system ECS of a power train of a motor vehicle MV.

The power train PWT comprises a power unit PU that can alternatively be a single or bi-fuel internal combustion engine, an electric motor or a hybrid engine, the output shaft CS of which is connected to a power-assisted transmission T that can indifferently be of the single-clutch type, as shown in FIG. 1, or of the dual-clutch type (not shown).

In the case of using a single-clutch transmission T, as shown in FIG. 1, the transmission T comprises a gearbox G with discrete or continuously variable ratios, with an input shaft I that can be coupled to the output shaft CS of the power unit PU through a single coupling or clutch. C external to the gearbox G, and an output shaft O connected to a pair of drive wheels W via a differential D of known type.

The clutch is servo-controlled by an associated electrically or hydraulically controlled actuator CA that can be operated to disengage and engage the clutch C in response to an electrical command.

The gearbox G is also servo-controlled by a plurality of electrically or hydraulically controlled actuators, indicated as a whole by reference GA, which can be operated to engage and disengage the gears corresponding to the different speed ratios available.

In the case of using a dual-clutch transmission T instead of a single clutch C external to the gearbox G, the transmission T comprises two distinct clutches (not shown), one associated with the even speed ratios and the other associated with the odd speed ratios, integrated inside the gearbox G.

In one embodiment, the electronic control system ECS comprises an electronic control unit PU-ECU dedicated to controlling the power unit PU, and an electronic control unit PWT-ECU dedicated to controlling the power train PWT, which is connected to the PU-ECU electronic control unit via an automotive onboard communication network NET, for example CAN, FlexRay or others, as well as to the actuators CA and GA associated with the clutch C and gearbox G.

In different embodiment that not shown, the PU-ECU electronic control unit and the PWT-ECU electronic control unit are integrated into a single electronic control unit PWT-ECU that performs the functions of both the PU-ECU and PWT-ECU electronic control units.

The electronic control system ECS also comprises a body computer BC connected to the electronic control unit PWT-ECU via the onboard communications network NET and programmed to receive quantities indicative of the operating conditions of systems/components on board the motor vehicle MV, such as the power train PWT, battery/batteries, accelerator pedal AP, brake pedal BP, handbrake, etc., and to manage the operation of the power train PWT in consequence.

The body computer BC and the electronic control units PU-ECU and PWT-ECU are programmed to store and execute control software for the power train PWT, which will be described in detail hereinafter.

Regarding the latter, it is considered useful to underline that, for the purposes or present invention, it is only important which functions are performed and not which of the body computer BC and the electronic control units PU-ECU and PWT-ECU specifically supervises the function that is being described each time, as this a software architecture decision taken by the car manufacturer.

The power train PWT functions in response to electrical commands generated by the electronic control units PU-ECU and PWT-ECU on the basis of commands given by the driver through a series of hand-operated or foot-operated devices connected to accelerator pedal AP, a brake pedal PP and one or more hand-operated controls for controls for controlling the transmission T and comprising a selector SL of an operating mode of the transmission T, a pair of paddles P for sequentially changing the forward speed gears, and a pushbutton or rocker or knob selector S of programs for automatically changing forward speed gears.

The selector SL can be operated to select one of a plurality of modes or operating conditions of the transmission T, comprising a reverse mode R, a neutral mode N, a drive mode D for automatically changing the forward speed gears and a manual step-by-step mode (M) for sequentially changing the forward speed gears by hand.

For the selection of one or more of the above-listed operating modes, the selector SL is of the monostable type, i.e. it is designed to assume, when not operated, a stable central neutral position, and to be moved by hand in first selection or operation directions from the stable central neutral position to reach two unstable or momentary end-of-travel positions arranged on opposite sides of the stable central neutral position, where the term ‘momentary’ is intended to indicate positions that the selector SL is capable of assuming and maintaining only as long as the driver’s hand operation lasts and from which it autonomously returns to the stable central neutral position when the &river’s hand operation ceases, and where the term ‘end-of-travel’ is intended to indicate positions that define the stop positions beyond which the selector cannot go, i.e. at which it stops without being able to continue further, or rather without being able to perform overtravel to further end-of-travel positions in response to the exertion of forces such as to allow it go beyond the end-of-travel positions.

Figure 2:
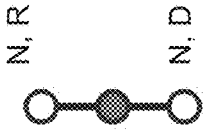
FIG. 2 shows a diagram of a selector shift pattern and associated automatic transmission operating modes.

FIG. 2 shows the diagram of the shift pattern of the selection lever and the operating modes of the transmission T associated with the shift pattern positions, as shall be described in detail hereinafter, and where the solid circular symbol represents the stable central neutral position and the two empty circular symbols represent the momentary selection positions.

The selector SL can also be designed to be further movable by hand from the stable central neutral position in second directions of selection or operation, transversal to the first directions of selection or operation, to reach one or more end-of-travel positions, which can be alternatively stable or momentary, but are also conveniently momentary.

In addition, the selector SL is equipped with a momentary pushbutton park switch P for selecting a park mode P, and a momentary pushbutton control switch B.

In a different embodiment that is not shown, the park mode P may be selected via the selection lever SL.

The selector SL is also appropriately sensorized to detect operation of the selector SL in the two opposite selection directions and reaching the momentary selection positions, as well as operation (pressing and releasing) of the park and control pushbutton switches P,B.

Figure 3:
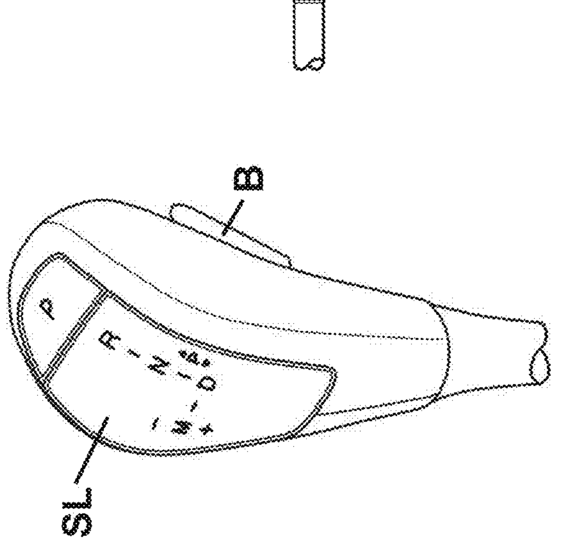
FIG. 3 shows a first embodiment of a driver-operable selector.

In one embodiment shown in FIG. 3, the selector SL is in the form of a selection lever conveniently arranged at the tunnel console arranged in the central tunnel of the motor vehicle, between the driver and passenger front seats, and terminating at the front in the so-called centre console.

The selection lever SL is mounted to be manually tippable longitudinally forwards and backwards from a substantially vertical stable central neutral position to reach the forward and backward momentary selection positions, respectively. In this embodiment, the selection lever SL thus performs an oscillatory movement about a fulcrum along a curvilinear path.

In an alternative embodiment, not shown, the selection lever SL is mounted to be manually displaceable longitudinally forwards and backwards from the substantially vertical stable central neutral position, but always to reach the forward and backward momentary selection positions, respectively. In this embodiment, the selection lever SL therefore performs a translational movement along a rectilinear path.

Furthermore, in both embodiments, the selection lever SL can be mounted to be also tippable or translatable transversely to the left and to the right from the stable central neutral position to reach one or more further lateral selection positions, which are conveniently, but not necessarily, momentary positions.

In particular, as shown in FIG. 2, the reverse mode R, neutral mode N, and drive mode D) are selectable by operating the selection lever SL in the forward and backward selection directions, while the manual step-by-step mode M is selectable by operating the selection lever SL in a transverse selection direction, to the left in the example shown, to reach a position, which can be alternatively stable or momentary, but is conveniently momentary. Following this operation, and possibly the subsequent return of the selection lever SL to the stable central neutral position, subsequent operations of the selection lever SL in the forward and backward selection directions cause changing up or down of the forward speed gears. To return to one of the other operating modes of the transmission T, it is sufficient to operate the selection lever SL in a transverse selection direction opposite to the previous one, to the right in the example shown.

Furthermore, in both embodiments, the park switch P is conveniently arranged on the top of the selection lever SL in such a way that when the lever is gripped the pushbutton park switch P thumb-operable, while the control switch B is conveniently arranged on a frontal area of the selection lever SL so that it can be operated by one or more of the index, middle, ring and little fingers. It goes without saying that the positions indicated for the control and park pushbuttons could be different from those indicated.

Figure 4:
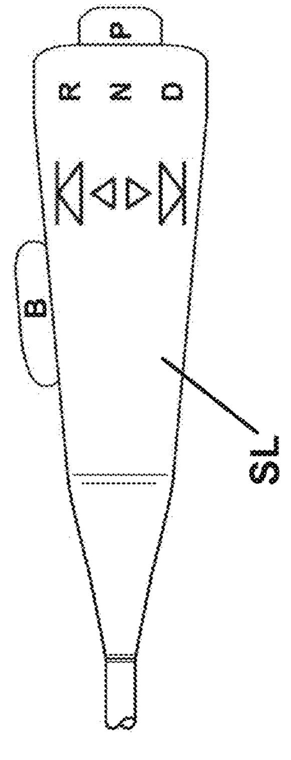
FIG. 4 shows a second embodiment of a driver-operable selector.

In an alternative embodiment shown in FIG. 4, the selection lever SL is arranged behind the steering wheel of the motor vehicle MV and mounted on the so-called steering column switch, which, as is known, is a device located behind the steering wheel and equipped with a series of levers through which the driver can control the operation of a series of onboard devices such as direction indicators, front and rear wipers, front and rear lights, etc.

In this embodiment, the selection lever SL is mounted to be manually tippable upwards and downwards from a substantially horizontal stable central neutral position to reach raised and lowered momentary selection positions, respectively. In this embodiment as well, the selection lever SL performs an oscillatory movement about a fulcrum along a substantially curvilinear path.

Furthermore, in this embodiment, the park switch P and the control switch B are conveniently arranged on a free end of the selection lever SL, one on the tip face and the other on the top part of the lateral surface, so that one can be operated with the thumb and the other with one or more fingers of the hand.

Figure 5:
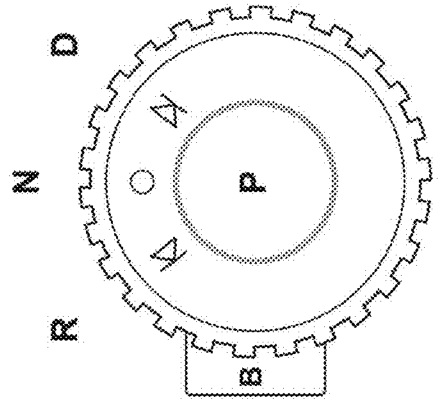
FIG. 5 shows a third embodiment of a driver-operable selector.

In a further alternative embodiment shown in FIG. 5, the selector SL is of a rotational rocking type and has the shape of a knob, conveniently mountable on the tunnel console with a vertical axis of rotation so as to be manually rotatable in a rocking manner to the left and to the right from the stable central neutral position, to reach the left and right momentary selection positions, respectively. In this embodiment, the knob performs a rotary movement with respect to a fulcrum along a substantially circular path.

In an alternative embodiment, the knob may be mounted on the tunnel console with a transversal horizontal axis of rotation so as to be manually rotatable in a forwards and backwards rocking manner like the selection lever SL. It goes without saying that other arrangements of the knob are possible.

Furthermore, in this embodiment, the park switch P and the control switch B are conveniently arranged at the centre of the knob and at the side of the knob, respectively.

In one embodiment, the paddles for sequentially changing gears, if provided, are coupled to the steering wheel so as to be rotationally integral with it and can be operated manually by the driver for sequentially changing up and down the forward speed gears in the manual step-by-step mode and, possibly, through specific operations, to implement further gear change functions, for example to implement specific gear change programs.

In a different embodiment, the manual sequential changing of the forward speed gears may be implemented via dedicated pushbuttons located on the steering wheel.

In a further embodiment, the manual sequential changing of the speed gears may be implemented via the selection lever SL.

In one embodiment, the pushbutton or rocker selector for programs for automatically changing the forward speed gears, if provided, can be located on the steering wheel or on the tunnel console, close to the selection lever SL, or in the central area of the dashboard and be hand operated to select one of a plurality of programs for automatically changing the forward speed gears, typically comprising a sports program and a fuel saving program, and possibly for making further selections, for example passing from manual step-by-step mode to drive mode and vice versa.

In a different embodiment, the selection of programs for automatically changing the forward speed gears can be implemented through the selection lever SL, appropriately operated.

The control software of the power train PWT is designed to determine, on the basis of electrical signals supplied by the sensor system of the selector SL, the operation of the selector SL and of the parking P and control B pushbutton switches, in particular the reaching of the momentary selection positions following taps given by the driver's hand to the selector SL, forwards and backwards in the above-described first embodiment, or up and down in the above-described second embodiment, or to the left and to the right in the above-described third embodiment, and the pressing and releasing of the parking P and control B pushbutton switches.

In a preferred embodiment, the control software is designed to implement, with the motor vehicle MV stationary, the passages between the various operating modes of the transmission T indicated in Table I below according to the selection directions (forward/up/left and backward/down/right) in which the selector SL is moved and based on the operating state (pressed/released) of the pushbutton control switch B.

TABLE I

| Motor Vehicle Stationary | | | | |
|---|---|---|---|---|
| Selected Mode | SL: Fwd/Up/Left B: Released | SL: Fwd/Up/Left B: Pressed | SL: Back/Down/ Right B: Released | SL: Back/Down/ Right B: Pressed |
| P | — | N | — | D |
| R | — | — | N | D |
| N | — | R | D | D |
| D | N | R | — | — |

As may be appreciated, the control software is designed to:

- when the transmission T is in park mode P:
  - cause the transmission T to switch to neutral mode N in response to a forward/up/left shift of the selector SL with the control switch B pressed, and to leave the transmission in park mode P in response to a forward/up/left shift of the selector SL with the control switch B released;
  - cause the transmission T to switch to drive mode D in response to a backward/down/right shift of the selector SL with the control switch B pressed, and to leave the transmission in park mode P in response to a backward/down/right shift of the selector SL with the control switch B released;
- when the transmission T is in reverse mode R:
  - leave the transmission T in reverse mode R in response to a forward/up/left movement of the selector SL, has no effect, regardless of the state (pressed or released) of the pushbutton control switch B; and
  - cause the transmission T to switch to neutral mode N in response to a backward/down/right shift of the selector SL, with the control switch B released, and to drive mode D in response to a backward/down/right shift of the selector SL, with the control switch B pressed;
- when the transmission T is in neutral mode N:
  - cause the transmission T to switch to reverse mode R in response to a forward/up/left shift of the selector SL with the control switch B pressed, and to leave the transmission T in neutral mode N in response to a forward/up/left shift of the selector SL with the control switch B released; and
  - cause the transmission T to switch to drive mode D in response to a backward/down/right shift of the selector SL, regardless of the state (pressed or released) of the control switch B; and
- when the transmission T is in drive mode D:
  - cause the transmission T to switch to neutral mode N in response to a forward/up/left shift of the selector SL with the control switch B released, and to reverse mode R in response to a forward/up/left shift of the selector SL with the control switch B pressed; and
  - leave the transmission T in drive mode D in response to a backward/down/right movement of the selector SL, regardless of the state (pressed or released) of the control switch B.

It goes without saying that the above-described association between cause and effect, or rather between the movements of the selector SL in the opposite selection directions and the consequent passages between the various operating modes of the transmission T, could be different from that described. In particular, those passages between the operating modes of the transmission T that have been described as caused by operating the selector SL in a given selection direction, for example forward/up/left or backward/down/right, could instead be caused by movements of the selector SL in the opposite selection direction, respectively backward/down/right or forward/up/left in the example considered.

Based on what has been described above, it is useful to underline that the control software enables performing:

switch from reverse mode R to drive mode D, and vice versa, with a single operation of the selector SL and keeping the pushbutton control switch B pressed; and switch from neutral mode N to reverse mode R with a single operation of the selector SL, while keeping the pushbutton control switch B pressed;

and instead prevents direct passage from park mode P to reverse mode R, requiring passage to first the neutral mode N or drive mode D.

This transforms into a safe and at the same time simple and intuitive control of the functioning of the transmission T.

Furthermore, the present invention enables implementing in a simple and intuitive manner the so-called forward and backward rocking function of the motor vehicle MV, useful for getting free when stuck in mud or similar.

In fact, by repeatedly operating the selector SL forwards/upwards/to-the-left and backwards/downwards/to-the-right and keeping the control switch B pressed, it is possible to repeatedly switch between modes R and D of the transmission T and so give the motor vehicle MV that forward and backward rocking movement to get the motor vehicle MV out of a situation of being stuck in mud or similar.

In a different embodiment, the control software is designed to implement, always with the motor vehicle stationary, the passages between the various operating modes of the transmission T indicated in Table II below according to the selection directions in which the selector SL is moved and based on the operating state of the control switch B.

TABLE II

| Motor Vehicle Stationary | | | | |
|---|---|---|---|---|
| Selected Mode | SL: Fwd/Up/Left B: Released | SL: Fwd/Up/Left B: Pressed | SL: Back/Down/ Right B: Released | SL: Back/Down/ Right B: Pressed |
| P | N/— | R | — | D |
| R | — | — | N | P |
| N | — | R | D | D |
| D | N | P | — | — |

As may be appreciated, this embodiment differs from that previously described with reference to Table I in that when the transmission T is in park mode P, the control software causes, in response to a forward/up/left operation of the selector SL with the control switch B pressed, switch to reverse mode R rather than to neutral mode N, as instead happens in the previous embodiment, while in response to a forward/up/left operation of the selector SL with the control switch B released, it causes the transmission T either to switch to neutral mode N or to remain in park mode P, depending on the market (EMEA, APAC, or NAFTA) to which the motor vehicle MV is destined.

The last possibility of causing the transmission T either to switch to neutral mode N or to remain in park mode P, can obviously also be implemented in the previous embodiment described with reference to Table I.

Therefore, in this embodiment, unlike the previous one, the control software enables direct passage from park mode P to reverse mode R, by keeping the pushbutton control switch B pressed during operation of the selector SL.

The switches between the operating modes of the transmission T that the control software implements with the motor vehicle in movement are instead indicated in Table III below.

TABLE III

| Motor Vehicle in Movement | | | | |
|---|---|---|---|---|
| Selected Mode | SL: Fwd/Up/Left B: Released | SL: Fwd/Up/Left B: Pressed | SL: Back/Down/ Right B: Released | SL: Back/Down/ Right B: Pressed |
| P | — | — | — | — |
| R | — | — | N | D |
| N | — | R | D | D |
| D | N | R | — | — |

As may be appreciated, in addition to obviously preventing any passage to park mode P when the motor vehicle MV is in movement, the control software is designed to implement in the reverse mode R, neutral mode N and drive mode D, the same switches of operating mode of the transmission T in response to operation of the selector SL and the control switch B as those contemplated with the motor vehicle MV stationary, with the further feature that these switched are only allowed when the motor vehicle MV is travelling in a direction consistent with the selected operating mode of the transmission T, i.e. backwards for reverse mode R and forwards for drive mode D, and at any speed, or in the opposite direction, i.e. forwards for the reverse mode R and backwards for the drive mode D, but at very low speed, i.e. below a given speed threshold, for example 6 km/h. Instead, when the motor vehicle MV is travelling in an opposite direction to that consistent with the selected operating mode of the transmission T at a speed higher than the speed threshold, the operation of the selector SL is ignored.

The invention claimed is:

1. An electronic control system (ECS) for a motor vehicle (MV) comprising an automatic transmission (T) operable to assume different operating modes, comprising a reverse mode (R), a neutral mode (N), a park mode (P), a drive mode (D) and a manual mode (M), in response to a manual operation of a selector (SL) with at least one control switch (B) and mounted to assume a stable central neutral position when the selector (SL) is not operated, and to be movable in opposite selection directions from the stable central neutral position to reach two instable end-of-travel selection positions arranged on opposite sides of the stable central neutral position;

the automotive electronic control system (ECS) is configured to detect operation of the selector (SL) and of the control switch (B) and:

when the transmission (T) is in drive mode (D):

cause the transmission (T) to switch to reverse mode (R) in response to operation of the selector (SL) in a first selection direction and with the control switch (B) pressed;

when the transmission (T) is in reverse mode (R):

cause the transmission (T) to switch to drive mode (D) in response to operation of the selector (SL) in a second selection direction opposite to the first selection direction and with the control switch (B) pressed.

2. An automotive electronic control system (ECS) according to claim 1, further configured to:

when the transmission (T) is in drive mode (D):

cause the transmission (T) to switch to neutral mode (N) in response to operation of the selector (SL) in the first selection direction and with the control switch (B) released; and when the transmission (T) is in reverse mode (R):

cause the transmission (T) to switch to neutral mode (N) in response to operation of the selector (SL) in the second selection direction and with the control switch (B) released.

3. An automotive electronic control system (ECS) according to claim 1, further configured to:

when the transmission (T) is in neutral mode (N):

cause the transmission (T) to switch to reverse mode (R) in response to operation of the selector (SL) in the first selection direction and with the control switch (B) pressed; and cause the transmission (T) to switch to drive mode (D) in response to operation of the selector (SL) in the second selection direction and with the control switch (B) pressed.

4. An automotive electronic control system (ECS) according to claim 3, further configured to ensure that:

when the transmission (T) is in neutral mode (N):

cause the transmission (T) to remain in neutral mode (N) in response to operation of the selector (SL) in the first selection direction and with the control switch (B) released; and cause the transmission (T) to switch to drive mode (D) in response to operation of the selector (SL) in the second selection direction and with the control switch (B) released.

5. An automotive electronic control system (ECS) according to claim 1, further configured to:

when the transmission (T) is in park mode (P):

cause the transmission (T) to switch to neutral mode (N) in response to operation of the selector (SL) in the first selection direction and with the control switch (B) pressed.

6. An automotive electronic control system (ECS) according to claim 1, further configured to:

when the transmission (T) is in park mode (P):

cause the transmission (T) to switch to reverse mode (R) in response to operation of the selector (SL) in the first selection direction and with the control switch (B) pressed.

7. An automotive electronic control system (ECS) according to claim 5, further configured to:

when the transmission (T) is in park mode (P):

cause the transmission (T) either to switch to neutral mode (N) or to remain in park mode (P) in response to operation of the selector (SL) in the first selection direction and with the control switch (B) released.

8. An automotive electronic control system (ECS) according to claim 1, further configured to:

when the transmission (T) is in park mode (P):

cause the transmission (T) to switch to drive mode (D) in response to operation of the selector (SL) in the second selection direction and with the control switch (B) pressed, and to remain in park mode (P) in response to operation of the selector (SL) in the second selection direction and with the control switch (B) released.

9. An automotive electronic control system (ECS) according to claim 1, further configured to:

cause said switches only when the motor vehicle (MV) is either stationary or travelling in a direction consistent with the selected operating mode of the transmission (T) or travelling in a direction opposite to that consistent with the selected operating mode of the transmission (T) at a speed lower than a threshold speed.

10. An automotive electronic control unit (ECU) for an automotive electronic control system (ECS) and configured to cause the automotive electronic control system (ECS) to become configured as claimed in claim 1.

11. Software loadable in an automotive electronic control unit (ECU) in an automotive electronic control system (ECS) and designed to cause, when executed, the automotive electronic control system (ECS) to become configured as claimed in claim 1.

12. An automotive automatic transmission (T) comprising a gearbox (G), a clutch (C) coupled to the gearbox (G), and an automotive electronic control system (ECS) according to claim 1.

13. A motor vehicle (MV) comprising an automatic transmission (T) according to claim 12.

* * * * *